Patented Jan. 28, 1941

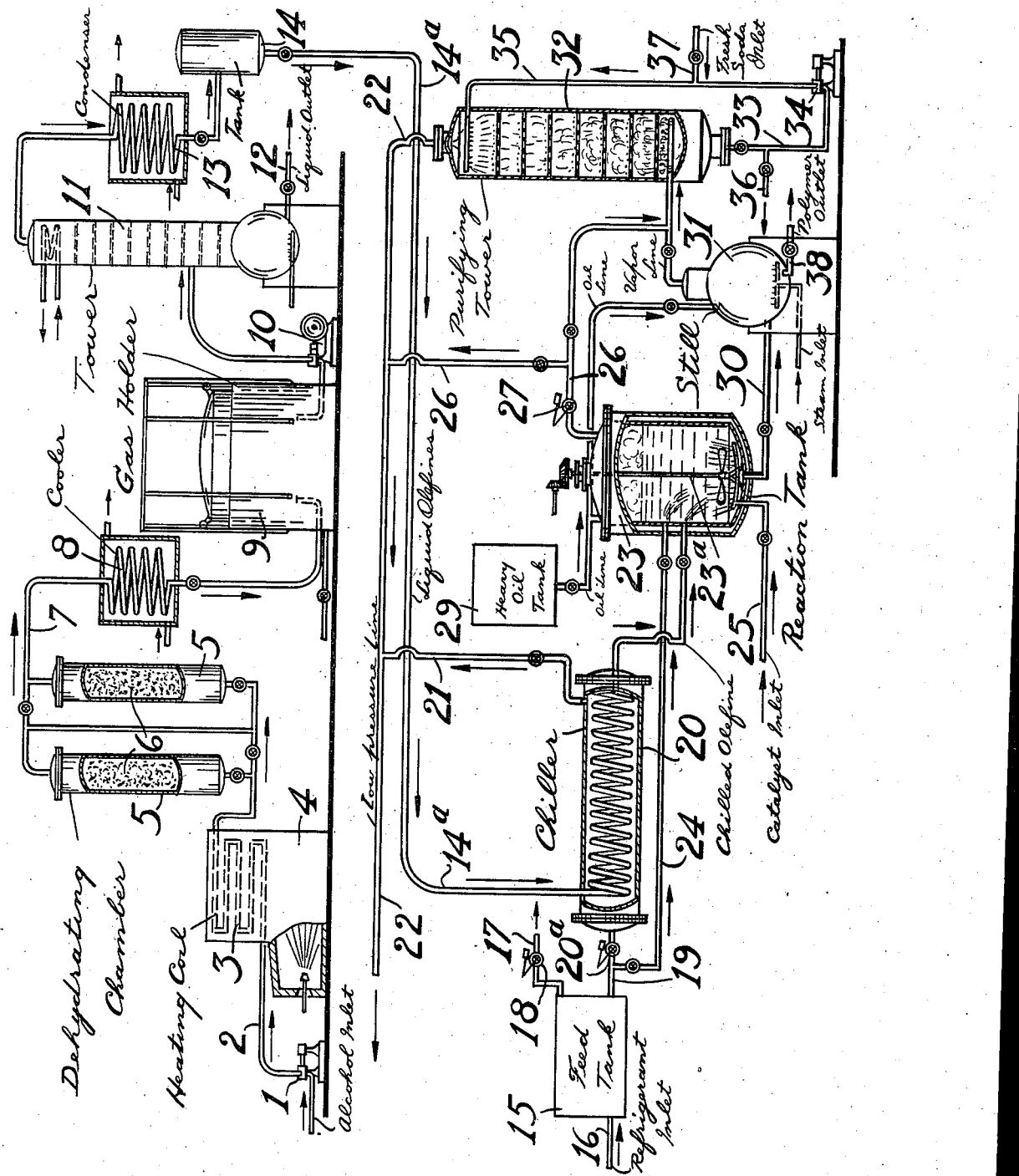

2,229,661

UNITED STATES PATENT OFFICE 2,229,661

LOW TEMPERATURE POLYMERIZATION OF ISO-OLEFINS

Matthew D. Mann, Jr., Roselle, N. J., assignor to Standard Oil Development Company, a corporation of Delaware Application August 12, 1933, Serial No. 684,813
Renewed April 26, 1938

7 Claims. (Cl. 260—94)

The present invention relates to an improved method for conducting reactions at low temperatures and more specifically for polymerizing certain polymerizable or condensible hydrocarbons or their derivatives to produce valuable blending products, lubricating oils and the like. The invention will be fully understood from the following description and the drawing.

The drawing is a diagrammatic representation in sectional elevation of an apparatus adapted to carry out the reactions which will be described below.

It is known that certain unsaturated hydrocarbons and certain hydrocarbon derivatives polymerize under low temperature conditions in a chain-like form which is quite different from the ordinary heat polymerization which is apparently characterized by the formation of ring structures. The polymers of the chain-like structure are non-asphaltic and are of great value as blending agents for lubricating oils, gasoline and other hydrocarbon materials, in that a small amount will produce a substantial thickening and in the case of lubricating oils a desirable increase in viscosity index.

Among materials which polymerize in this manner are the olefins of low molecular weight such as ethylene and propylene, but iso-olefins, particularly alpha olefins of which isobutylene is an example, are preferred. These materials polymerize in chain-like form at lower temperatures, say below 0° F. in the presence of catalysts such as active clays, but particularly in the presence of active halide catalysts such as aluminum chloride, boron fluoride, titanium chloride and the like. The same catalysts are useful in polymerizing other materials in substantially the same manner to produce long chain-like structures, for example, styrol and indene. Still other materials react in the same manner such as aromatic rings and dichlor-hydrocarbons of less than say five carbon atoms. Of this type ethylene dichloride and benzol in equimolal proportions is very satisfactory. These materials polymerize or condense with alternating ring and chain structures; but it appears that practically no rings are produced in the reaction. The various materials produced by these reactions may be used alone in many cases for blending with lubricating oils but in other instances it is preferred to hydrogenate and alkylate them in order to increase solubility and effectiveness.

All of the above reactions generate heat and in large scale operations this gives considerable difficulty due to low temperature at which the reaction is carried out, the necessity of withdrawing it rapidly, and the thick gummy nature of the reaction product. The present invention provides a method for conducting the reaction with ease and efficiency.

In the following description the method of producing a polymer from isobutylene will be specifically disclosed and it will be understood that this is representative in general of the operation used in producing the other polymers of the type mentioned above although temperature, catalyst and the like may not be the most satisfactory for all cases.

Turning to the drawing numeral 1 represents a feed pump which forces tertiary butyl alcohol from storage (not shown) through line 2 to a heating coil 3 arranged in a furnace setting 4. The heating coil discharges into a dehydrating chamber 5 which is shown in the form of several parallel tubes. These are filled with a dehydrating catalyst 6 of a well known type such as alumina, thoria, zirconia and the like, or mixtures of such substances with each other or with other ingredients to increase their dehydrating action. Dehydration of the alcohol occurs in the tubes 5 and the mixture with or without unreacted alcohol passes out of the top by pipe 7. The gases are cooled in a cooler 8 and collected in storage tank 9.

The gas is conducted from the holder 9 and compressed in a compressor 10 to a pressure such that the olefin will be liquefied on cooling to normal temperature. The heat of compression keeps the olefin in gaseous state while the unreacted alcohol and any other constituents such as water or heavier hydrocarbons which may be present are obtained as a liquid. The gas is scrubbed and/or fractionated in a tower 11 to assist condensation of normally liquefiable constituents and the liquid effluent is drawn off at pipe 12. The gas, which now has a high olefin concentration, is chilled in condenser 13 while under high pressure and caused to condense. This condensate is collected in the tank 14.

A refrigerant is supplied to a feed tank 15 by a pipe 16 and this may comprise a light hydrocarbon such as propane. But a great many other equivalent materials may be used, as will be disclosed below. The preferred refrigerant is a fraction obtained as a reflux condensate in the stabilization of cracked naphthas. Stabilization is a known process of rectification in which normally gaseous constituents are separated from cracked distillates. The condensate is essentially propane but contains also some butane and ethane as well as unsaturated light hydrocarbons. This material is liquefied by pressure and is supplied to the feed tank 15 in that condition. The pressure depends on the composition and the temperature but the tank is ordinarily kept at substantially atmospheric temperature and with propane a pressure of 100–150 lbs. per sq. in. is necessary.

A venting line 17 is provided with an automatic valve 18 set to release excess pressure, should it build up.

From tank 15 line 19 conducts the liquid refrigerant to a chiller 20 built like a heat exchanger through which liquefied olefins from tanks 14 are passed in order to attain a low temperature for reaction. The refrigerant, which is released at valve 20ª, rapidly evaporates producing a low temperature and is then passed by line 21 to a low pressure main 22. The chilled olefin now passes to a reaction tank 23 which is provided with a device 23ª for rapid agitation. An additional outlet line 24 conducts refrigerating liquid from tank 15 to tank 23 and a suitable catalyst is also added. If the catalyst be liquid, as in the case of titanium chloride, or gaseous as boron fluoride, it is added by means of line 25, which discharges into the bottom of tank 23 in a suitable distributor in order to be present in a finely divided form. The reaction tank 23 is maintained at low temperature by allowing a portion of the refrigerant from tank 15 to evaporate. A vent line 26 is provided with an automatic valve 27 which controls pressure and consequently temperature in the reaction chamber. This line may discharge into a low pressure main 22 preferably after passing through a purification tower which is shown in the drawing and will be described below. A tank 29 is provided with a supply of heavy oil, preferably a lubricating fraction and it may be drawn into tank 23 at the end of the reaction or during it so as to take up the polymer formed and carry it through the line 30 to a still 31 which may be heated gently by a steam coil or otherwise. If desired, the polymer may be forced out of the reaction chamber by allowing pressure to build up and the oil may then be added to the still 31.

The refrigerating diluent is entirely evaporated from the still 31 and with it the last traces of the catalyst, if it be volatile or gaseous as boron fluoride. The vapor is ordinarily passed into the purifying tower 32 where it receives an alkaline wash, preferably using caustic soda. The soda solution is circulated through line 33 pump 34 and line 35. Spent soda may be withdrawn by line 36 and fresh added by 37. The spent soda may be worked up for the recovery of the catalyst if desired. Purified vapors may be recycled through the reaction chamber but preferably pass directly into the main 22, and may be used as fuel or recovered for other purposes. The polymer dissolved in the heavy oil is drawn off by line 38 and collected in storage (not shown).

In the operation of the process the dehydration is conducted at temperatures of 500°–650° F., preferably with the catalysts mentioned above. Several reaction chambers may be used as tubes in parallel or in series so as to obtain complete conversion of the alcohol to olefin. Steam may be added along with the alcohol but its partial pressure should not, of course, be as high as to seriously hinder the reaction. Atmospheric or a slight pressure of 2 to 10 atmospheres may be used.

The olefin gas is condensed and, as will be understood, the pressure and temperature for this may vary interdependently, but the temperature may be broadly described as sub-atmospheric. With isobutylene at normal cooling water temperatures, a pressure of from 20–50 lbs. is sufficient. The liquid is then chilled to a sub-atmospheric temperature preferably well below 0° C., for example, as low as −20° or even −80° C., in the heat exchanger before entering the reaction vessel 23. In the reaction vessel, or just before entering thereinto, the olefin is mixed with chilled refrigerant which, as indicated above, may be propane. The amount of diluent should be sufficient not only to permit of maintaining the temperature at the low value indicated by means of cooling obtained by evaporation, but also to maintain the polymer in a more or less loosely suspended form. It has been found that for this purpose 3 to 5 gallons of propane may be used for each gallon of the olefin. These materials may be added concurrently or successively, continuously, in increments, or all at once and such variations in procedure are found to be of more or less advantage with different forms of apparatus.

The reaction is preferably conducted in batches and valves are provided in the feed lines for this purpose. The reaction may, of course, be made continuous but a different form of reaction chamber is then preferred. For example, a vertical tube or bundle or tubes may be provided into the lower end or ends of which the polymerizable constituent, refrigerant and catalyst are continuously fed and which discharge preferably by means of overflow at the upper end into an enlarged chamber. The reaction is largely completed in the tube or tubes and the gases may be separated from the liquid in the enlarged chamber. If desired the fluxing lubricating oil may be added to the upper chamber and stirring means may be added to hasten solution of the polymer. As before the cooling is effected by evaporation of the diluent and controlled by pressure adjustment. While this type of continuous apparatus is effective, other types may be readily devised by those skilled in the art.

The reaction time depends upon the catalyst and the particular polymerizable constituents, the extent of dilution and the temperature, but it may be described generally as a short time, always less than one hour and frequently less than fifteen minutes. Ordinarily a cycle can be accomplished in one-half to three-quarters of an hour. At the end of the reaction lubricating oil may be added to dissolve the reaction products and assist in the removal of the gummy polymer from the reaction chamber through line 38. Ordinarily three volumes of oil to one of polymer make a desirable mixture which after removal of light oil may be used as a blending stock for increasing viscosity index of other oils. If desired, the oil with which the polymer is to be ultimately blended may be added at this point but it is usually more convenient to add a light boiling distillate such as a neutral oil and blend this with various different fractions to be thickened. The still 31 is used to distill off the remainder of the diluent and catalyst. If the polymer is to be used in a purified state free of heavy oils, the diluent mixture may be withdrawn and evaporated leaving the polymer or kerosene may be added which can readily be distilled off.

Where a solid or difficultly distillable catalyst is used, it may be hydrolyzed by acid, alkali or water and the hydrolyzation products separated by means of a filtration step, but gaseous catalysts such as boron fluoride are preferred.

As indicated above, temperature conditions for reaction differ depending on the nature of the polymerizable constituent. In all cases the temperature is subatmospheric and preferably below 0° C. and it is found as a general rule that the lower the temperature, the higher the average molecular weight of the polymer produced. Temperatures of −20° to −80° C. are preferred with isobutylene to produce various molecular weight polymers adapted for thickening lubricating oils, gear oils and the like.

In maintaining the temperature use is made of an evaporative diluent or refrigerant in direct contact. Stabilizer reflux condensate has been described above. It is largely propane. By suitable pressure control the rate of evaporation is controlled and a temperature of any desired level may be accurately maintained practically automatically. With propane a pressure of 60 lbs. will produce a temperature of approximately 0° C. If the pressure be 25 lbs., the temperature will be about −20° and at atmospheric pressure the temperature is below −40° C. It has been observed that accurate temperature control, within 5° or even 3° C., is very desirable since this produces a narrow molecular weight range of polymers, which is not obtained if temperature varies widely, as in methods involving indirect cooling.

While it is generally preferable to use refrigerants boiling below the polymerizable constituent, in the case of isobutylene and similar low boiling olefins these substances may fulfill a dual role, as both a polymerizable constituent and refrigerant; in other words, the evaporation of a part of the polymerizable constituent may produce the low temperature at which the reaction is carried out. In such cases it may be desirable to maintain the reaction chamber at a reduced pressure, that is, below atmospheric, although with propane stabilizer bottoms and the preferred refrigerants, positive pressures are usually maintained. Propane obtained from any source is useful but a relatively pure propane is of course not required. Mixtures containing 75% propane and 25% ethane or even more ethane may be used and the composition of the refrigerant may be varied so as to obtain an accurate temperature control at any stated pressure, for example atmospheric. The greater the amount of ethane, the lower is the temperature which can be obtained. Other refrigerants such as liquid carbon dioxide and sulfur dioxide may also be used. Methyl chloride and liquefied unsaturated gases may also be employed, for example, propylene or especially ethylene with isobutylene as the polymerizable constituent. Since the latter reacts much more rapidly, however, there will be a polymerization of the unsaturated constituents, and for this reason saturated unreactive refrigerants such as propane or propane and ethane are preferred.

As to the source of polymerizable constituents, that must necessarily vary with the particular constituent. With olefins, such as isobutylene, the alcohols furnish a good source and these in turn may be produced by scrubbing cracked gases with sulfuric or other acids under esterifying conditions which are, of course, well known. The olefins may, however, be obtained directly from cracked gases by rectification processes. Styrol may be obtained from gases cracked at high temperatures or may be prepared by synthetic methods. Other appropriate sources of these materials will be apparent to those skilled in the art.

The present invention is not to be limited by any theory of the nature of reaction nor to any particular polymerizable constituents, refrigerating fluids or the like, but only to the following claims in which it is desired to claim all novelty inherent in the invention.

I claim:

1. An improved process for producing hydrocarbon polymers of high molecular weight from isobutylene which comprises adding the olefin in liquid condition to a reaction zone and providing at least three gallons of propane per gallon of isobutylene, bubbling boron fluoride through the liquid and agitating for a short time to bring about polymerization, meanwhile maintaining the temperature below −20° C. by evaporation of a portion of the propane but maintaining a sufficient portion in liquid condition to produce an easily flowing mass with the polymer, then adding a normally liquid oil to the polymer-propane mixture and removing the propane therefrom.

2. The process of continuously converting an iso-olefin into high molecular weight polymers, which comprises continuously introducing the iso-olefin, an inert liquefied normally gaseous organic diluent, and an active metal halide polymerization catalyst into a reaction zone wherein said iso-olefin mixed with the diluent forms a liquid reaction mixture, maintaining said liquid reaction mixture at a temperature below −20° C. with controlled evaporation of said liquefied diluent while effecting polymerization of said iso-olefin in the presence of the catalyst, and after the polymerization of the iso-olefin has been completed, mixing the remaining liquefied diluent of said reaction mixture containing polymerized iso-olefin in suspension with a normally liquid hydrocarbon oil, then separating the diluent from a solution of the polymerized iso-olefin in said normally liquid hydrocarbon oil.

3. In the process for producing high molecular weight hydrocarbon polymers from an iso-olefin with an active metal halide catalyst at temperatures below 0° C., the improvement which comprises diluting said iso-olefin with an inert liquefied normally gaseous organic diluent, said diluent having a boiling temperature which corresponds to the desired reaction temperature at the operating pressure under which polymerization of the iso-olefin takes place in a polymerization zone and which is substantially below the boiling temperature of the iso-olefin at the operating pressure in said polymerization zone, contacting the diluted iso-olefin with the active metal halide catalyst in the polymerization zone to effect polymerization of said olefin, whereby heat is liberated and at least a portion of said liquefied diluent is vaporized, and removing vapors of the diluent from said polymerization zone to maintain the desired operating pressure and temperature.

4. In the process of producing high molecular weight hydrocarbon polymers from an iso-olefin by treatment with an active metal halide polymerization catalyst at temperatures below −20° C., the improvement which comprises introducing into a polymerization zone an iso-olefin to be polymerized, the active metal halide catalyst, and a liquefied normally gaseous organic diluent, said diluent under the conditions in the polymerization zone being unreactive and having a boiling temperature which corresponds to the desired polymerization temperature but which is below the boiling temperature of the iso-olefin under said conditions, effecting the polymerization of the iso-olefin in said polymerization zone at a temperature below —20° C. with controlled evaporation of said liquefied diluent, and maintaining in said polymerization zone a portion of said liquefied diluent to hold in suspension high molecular weight polymers formed from said iso-olefin.

5. The process as described in claim 4 in which the iso-olefin treated is iso-butylene, the catalyst is boron fluoride, and the diluent comprises essentially a liquefied normally gaseous hydrocarbon having from 2 to 3 carbon atoms per molecule.

6. The improvement in the process of producing high molecular weight hydrocarbon polymers by the polymerization of isobutylene at temperatures below —20° C. under the influence of boron fluoride catalyst, which comprises bringing the catalyst into contact with liquefied isobutylene in the presence of a liquefied normally gaseous organic diluent in a polymerization zone, said diluent being unreactive and more volatile than the isobutylene under the operating conditions in said polymerization zone, wherein a sufficient amount of said diluent is maintained in liquid condition to act as a refrigerant by boiling at the reaction temperature.

7. The process in accordance with claim 6 in which said liquefied diluent, said liquefied isobutylene, and the catalyst are continuously added to said polymerization zone, the catalyst being discharged into the polymerization zone in a finely divided form.

MATTHEW D. MANN, Jr.